US005709921A

United States Patent [19]
Shawver

[11] Patent Number: 5,709,921
[45] Date of Patent: Jan. 20, 1998

[54] CONTROLLED HYSTERESIS NONWOVEN LAMINATES

[75] Inventor: Susan Elaine Shawver, Roswell, Ga.

[73] Assignee: Kimberly-Clark Worldwide, Inc., Irving, Tex.

[21] Appl. No.: 555,471

[22] Filed: Nov. 13, 1995

[51] Int. Cl.$^6$ .................. B32B 5/04; B32B 5/06; B32B 5/26; B32B 25/08; B32B 25/10
[52] U.S. Cl. .................. 428/152; 428/286; 428/287; 428/300; 428/301; 428/303; 428/903; 604/385.1
[58] Field of Search .................. 428/152, 286, 428/287, 300, 301, 303, 903

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | |
| 3,502,763 | 3/1970 | Hartmann | 264/210 |
| 3,542,615 | 11/1970 | Dobo et al. | 156/181 |
| 3,692,618 | 9/1972 | Dorschner et al. | |
| 3,802,817 | 4/1974 | Matsuki et al. | 425/66 |
| 3,849,241 | 11/1974 | Butin et al. | |
| 3,855,046 | 12/1974 | Hansen et al. | |
| 4,041,203 | 8/1977 | Brock et al. | 428/157 |
| 4,340,563 | 7/1982 | Appel et al. | 264/518 |
| 4,374,888 | 2/1983 | Bornslaeger | 428/198 |
| 4,443,513 | 4/1984 | Meitner et al. | 422/195 |
| 4,522,982 | 6/1985 | Ewen | 525/240 |
| 4,542,199 | 9/1985 | Kaminsky et al. | 526/160 |
| 4,631,933 | 12/1986 | Carey, Jr. | 66/192 |
| 4,652,487 | 3/1987 | Morman | 428/138 |
| 4,655,760 | 4/1987 | Morman et al. | 604/385 |
| 4,657,802 | 4/1987 | Morman | 428/152 |
| 4,663,220 | 5/1987 | Wisneski et al. | 428/221 |
| 4,692,371 | 9/1987 | Morman et al. | 428/224 |
| 4,720,415 | 1/1988 | Vander Wielen et al. | 428/152 |
| 4,741,949 | 5/1988 | Morman et al. | 428/224 |
| 4,781,966 | 11/1988 | Taylor | 428/152 |
| 4,789,699 | 12/1988 | Kieffer et al. | 524/271 |
| 4,803,117 | 2/1989 | Daponte | 428/228 |
| 4,891,957 | 1/1990 | Strack et al. | 66/192 |
| 4,892,851 | 1/1990 | Ewen et al. | 502/104 |
| 4,910,064 | 3/1990 | Sabee | 428/113 |
| 4,937,299 | 6/1990 | Ewen et al. | 526/119 |
| 4,937,301 | 6/1990 | Chang | 526/128 |
| 4,965,122 | 10/1990 | Morman | 428/225 |
| 4,981,747 | 1/1991 | Morman | 428/198 |
| 5,001,205 | 3/1991 | Hoel | 526/128 |
| 5,036,034 | 7/1991 | Ewen | 502/117 |
| 5,064,802 | 11/1991 | Stevens et al. | 502/155 |
| 5,086,025 | 2/1992 | Chang | 502/117 |
| 5,108,820 | 4/1992 | Kaneko et al. | 428/198 |
| 5,108,827 | 4/1992 | Gessner | 428/219 |
| 5,114,781 | 5/1992 | Morman | 428/198 |
| 5,147,949 | 9/1992 | Chang | 526/129 |
| 5,169,706 | 12/1992 | Collier, IV et al. | 428/152 |
| 5,178,931 | 1/1993 | Perkins et al. | 428/198 |
| 5,189,192 | 2/1993 | LaPointe et al. | 556/11 |
| 5,198,401 | 3/1993 | Turner et al. | 502/155 |
| 5,200,246 | 4/1993 | Sabee | 428/109 |
| 5,204,429 | 4/1993 | Kaminsky et al. | 526/308 |
| 5,206,075 | 4/1993 | Hodgson, Jr. | 428/216 |
| 5,219,633 | 6/1993 | Sabee | 428/109 |
| 5,225,500 | 7/1993 | Elder et al. | 526/127 |
| 5,226,992 | 7/1993 | Morman | 156/62.4 |
| 5,227,440 | 7/1993 | Canich et al. | 526/129 |
| 5,239,022 | 8/1993 | Winter et al. | 526/127 |
| 5,243,001 | 9/1993 | Winter et al. | 526/127 |
| 5,243,002 | 9/1993 | Razavi | 526/170 |
| 5,266,392 | 11/1993 | Land et al. | 428/224 |
| 5,272,003 | 12/1993 | Peacock | 428/357 |
| 5,272,236 | 12/1993 | Lai et al. | 526/348.5 |
| 5,273,797 | 12/1993 | Hazelton et al. | 428/34.7 |

(List continued on next page.)

FOREIGN PATENT DOCUMENTS

| | | | |
|---|---|---|---|
| 0 712 892 | 5/1996 | European Pat. Off. | C08L 23/16 |
| 4-327211 | 11/1992 | Japan. | |
| 95/03443 | 2/1995 | WIPO | D04H 13/00 |
| 95/05418 | 2/1995 | WIPO | C08L 23/04 |

OTHER PUBLICATIONS

*Insite Catalyst Structure/Activity Relationships For Olefin Polymerization*, by J. C. Stevens. Central Research Catalysis Lab, The Dow Chemical Company. Presented at METCON 1993. Sponsored by Catalyst Consultants, Inc.
USA:Touch New Plastic Introduced by Exxon Chemical. Reuter Business Alert. Sep. 13, 1995.
USA: Exxon Chemical–First Commercial Scale Production Run of Metallocene–Based PP Successfully Completed. Reuter Business Alert. Oct. 4, 1995.
*Oscillating Catalysts: A New Twist For Plastics*, By K. B. Wagener. Science, vol. 267, Jan. 13, 1995. p. 191.
*Oscillating Stereocontrol: A Strategy For The Synthesis Of Thermoplastic Elastomeric Polypropylene*, By Geoffrey W. Coates & Robert M. Waymouth. Science, vol. 267, Jan. 13, 1995. pp. 217–219.
*Variation Of Poly(Propylene) Microtacticity By Catalyst Selection*, by Scott Collins, et al., Dept. Of Chemistry, Univ. of Waterloo, Waterloo, Ontario, Canada. Received Dec. 19, 1990. Organometallics 1991, 10, 2061–2068.
*Crystalline–Amorphous Block Polypropylene And Nonsymmetric Ansa–Metallocene Catalyzed Polymerization*, by Geraldo Hidalgo Llinas, et al., Dept. Of Polymer Science and Engin. Macromolecules 1992, 25, 1242–1253.

(List continued on next page.)

Primary Examiner—James C. Cannon
Attorney, Agent, or Firm—James B. Robinson

[57] ABSTRACT

There is provided herein a multilayer material comprised of layers of elastomeric films, fiber, or webs wherein at least one layer is comprised of an elastomeric polyolefin and at least one additional layer is comprised of an elastomer selected from the group consisting of polyurethanes, copolyether esters, polyamide polyether block copolymers, ethylene vinyl acetates (EVA), and block copolymers having the general formula A-B-A', A-B-A-B or A-B like copoly (styrene/ethylene-butylene), (polystyrene/poly(ethylene-butylene)/polystyrene), and poly(styrene/ethylene-butylene/styrene). Such a material also includes at least one gatherable web to which the elastic webs are joined and may be made into a personal care product, an infection control product, a protective cover or a garment.

17 Claims, 4 Drawing Sheets

U.S. PATENT DOCUMENTS

| | | | |
|---|---|---|---|
| 5,278,119 | 1/1994 | Turner et al. | 502/155 |
| 5,278,264 | 1/1994 | Spaleck et al. | 526/127 |
| 5,278,272 | 1/1994 | Lai et al. | 526/348.5 |
| 5,281,679 | 1/1994 | Jejelowo et al. | 526/114 |
| 5,283,300 | 2/1994 | Haspeslagh et al. | 526/75 |
| 5,306,545 | 4/1994 | Shirayanagi et al. | 428/198 |
| 5,320,798 | 6/1994 | Chambon et al. | 264/564 |
| 5,322,728 | 6/1994 | Davey et al. | 428/296 |
| 5,324,576 | 6/1994 | Reed et al. | 428/224 |
| 5,324,800 | 6/1994 | Welborn, Jr. et al. | 526/160 |
| 5,331,054 | 7/1994 | Fujita et al. | 525/240 |
| 5,332,613 | 7/1994 | Taylor et al. | 428/152 |
| 5,336,545 | 8/1994 | Morman | 428/152 |
| 5,336,552 | 8/1994 | Strack et al. | 428/224 |
| 5,349,100 | 9/1994 | Mintz | 585/350 |
| 5,352,749 | 10/1994 | DeChellis et al. | 526/68 |
| 5,358,792 | 10/1994 | Mehta et al. | 428/516 |
| 5,359,015 | 10/1994 | Jejelowo | 526/114 |
| 5,374,696 | 12/1994 | Rosen et al. | 526/126 |
| 5,376,439 | 12/1994 | Hodgson et al. | 428/220 |
| 5,380,810 | 1/1995 | Lai et al. | 526/352 |
| 5,382,400 | 1/1995 | Pike et al. | 264/168 |
| 5,385,775 | 1/1995 | Wright | 428/284 |
| 5,391,618 | 2/1995 | Yamamoto et al. | 525/88 |
| 5,393,599 | 2/1995 | Quantrille et al. | 428/284 |
| 5,397,613 | 3/1995 | Georgelos | 428/36.7 |
| 5,408,017 | 4/1995 | Turner et al. | 526/134 |

OTHER PUBLICATIONS

*Polyethylene And Ethylene Based Copolymers Made By Dow's Insite Technology*, Presentation by Steven P. Chum, Ph.D., Res. Scientist, Dow Chemical Company, Freeport, Texas, Jan. 1995.

*Selected Application For Constrained Geometry Catalyst Technology (CGCT) Polymers*, by G.D. Schwank, Polyolefins TS&D, Dow Chem., Presented at SPO '92, Sep. 23, 1992.

*Usins Molecular Architecture Control To Design Polymer Performance*, by Gerald Lancaster et al., Presentation at METCON '95, Session IV—Advances in Metallocene Resins Technology, Houston, Texas, May 1995.

*Dow Constrained Goemetry Catalyst Technology (CGCT): New Rules For Ethylene a–Olefins Interpolymers–Controlled Rheology Polyolefins*, by S. Lai and G.W. Knight, Antec 1993, pp. 1188–1192.

*Process Technology For Unique Polymer Design Using Dow Constrained Goemetry Catalyst*, by Kurt W. Swogger, et al., Polyolefins & Elastomers R&D, The Dow Chemical Company, Freeport, Texas.

*The New Family Of Polyolefins From Insite Technology*, by B.A. Story and G.W. Knight, Polyolefins & Elastomers R&D, The Dow Chemical Company, Freeport, Texas.

*Polymer Blends And Composites*, by John A. Manson and Leslie H. Sperling, Sec. 9.2, Bicomponent and Biconstituent Fibers, pp. 273–277, Plenum Press, New York.

5,709,921

CONTROLLED HYSTERESIS NONWOVEN LAMINATES

BACKGROUND OF THE INVENTION

Thermoplastic resins have been extruded to form fibers, films and webs for a number of years. The most common thermoplastics for this application are polyolefins, particularly polypropylene, though each material has its characteristic advantages and disadvantages visa vis the properties desired in the final products.

Nonwoven fabrics are one type of product which can be made from such polymers and are useful for a wide variety of applications such as personal care products like diapers, feminine hygiene products and incontinence products, infection control products, garments and many others. The nonwoven fabrics used in these applications are often in the form of laminates having various numbers of layers of meltblown fabric and spunbond fabric like spunbond/meltblown/spunbond (SMS) laminates, SMMS laminates and even laminates having 6 or more layers.

One particular type of desirable thermoplastic polymer used to make fibers, films and webs is elastic. One example of a composition for producing such products is disclosed in U.S. Pat. No. 4,663,220 to Wisneski et al. wherein the fiber is produced from a polymer which is an A-B-A' block copolymer where "A" and "A'" are each a thermoplastic endblock which comprises a styrenic moiety and where "B" is an elastomeric poly(ethylene-butylene) midblock, and a polyolefin processing aid.

While polyolefins like polyethylene and polypropylene have heretofore been non-elastomeric, recent advances in polymer and catalyst technology have produced a new class of materials known as metallocene polymers. The polymers produced through the metallocene process have properties which are different than those produced through traditional Ziegler-Natta and other systems and some of these polymers may be elastomeric. Metallocene based elastomeric polyolefins have stretch and recovery characteristics different from those elastomers already known.

The inventor has found that a multilayer laminate in which some of the layers are made from elastomeric polyolefins which may be produced through the metallocene process, and some of the layers are produced from traditional elastomers allows one to tailor the stretch and recovery characteristics of the finished product to a very high degree. This is believed to be a superior method to that of merely blending different elastomers prior to fiber production for a number of reasons; firstly, blends, like chemical reactions, can be unpredictable and can actually result in a decrease in the desired properties of the fabric, and secondly, some polymers may not be miscible or may not be capable of being made into a blend.

It is an object of this invention to provide laminates having at least one layer of elastomeric polyolefin with at least one layer of other elastomeric polymers to allow for greater control of the properties of materials produced from such laminates.

SUMMARY OF THE INVENTION

There is provided herein a multilayer laminate comprised of layers of elastomeric films, fiber, or webs wherein at least one layer is comprised of an elastomeric polyolefin and at least one additional layer is comprised of an elastomer selected from the group consisting of polyurethanes, copolyether esters, polyamide polyether block copolymers, ethylene vinyl acetates (EVA), and block copolymers having the general formula A-B-A' or A-B like copoly(styrene/ethylene-butylene), (polystyrene/poly(ethylene-butylene)/polystyrene), and poly(styrene/ethylene-butylene/styrene). Such a laminate may be made into a personal care product, an infection control product, a protective cover or a garment.

DEFINITIONS

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91). As used herein the term "microfibers" means small diameter fibers having an average diameter not greater than about 75 microns, for example, having an average diameter of from about 0.5 microns to about 50 microns, or more particularly, microfibers may have an average diameter (from a sample of at least 10) of from about 2 microns to about 40 microns. Another frequently used expression of fiber diameter is denier, which is defined as grams per 9000 meters of a fiber. For example, the diameter of a polypropylene fiber given in microns may be converted to denier by squaring, and multiplying the result by 0.00629, thus, a 15 micron polypropylene fiber has a denier of about 1.42 ($15^2 \times 0.00629 = 1.415$).

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241. Meltblown fibers are microfibers which may be continuous or discontinuous, are generally smaller than 10 microns in average diameter, and are generally tacky when deposited onto a collecting surface.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

As used herein, the term "machine direction" or MD means the length of a fabric in the direction in which it is produced. The term "cross machine direction" or CD means the width of fabric, i.e. a direction generally perpendicular to the MD.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, etc. These additives, e.g. titanium dioxide for coloration, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Conjugate and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, the term "compaction roll" means a set or rollers above and below the web to compact the web as a way of pre- or primarily bonding a just produced spunbond web in order to give it sufficient integrity for further processing, but not the relatively strong bonding of secondary bonding processes like TAB, thermal bonding, hydroentanglement and ultrasonic bonding. Compaction rolls slightly squeeze the web in order to increase its self-adherence and thereby its integrity. Compaction rolls perform this function well but have a number of drawbacks. One such drawback is that compaction rolls do indeed compact the web, causing a decrease in bulk or loft in the fabric which may be undesirable for the use desired. A second and more serious drawback to compaction rolls is that the fabric will sometimes wrap around one or both of the rolls, causing a shutdown of the fabric production line for cleaning of the rolls, with the accompanying obvious loss in production during the down time. A third drawback to compaction rolls is that if a slight imperfection is produced in formation of the web, such as a drop of polymer being formed into the web, the compaction roll can force the drop into the foraminous belt, onto which most webs are formed, causing an imperfection in the belt and ruining it.

As used herein, the term "hot air knife" or HAK means a process of pre- or primarily treating a just produced spunbond web in order to give it sufficient integrity for further processing but not the relatively strong bonding of secondary bonding processes like TAB, thermal bonding, hydroentanglement and ultrasonic bonding. A hot air knife is a device which focuses a stream of heated air at a very high flow rate, generally from about 1000 to about 10000 feet per minute (fpm) (305 to 3050 meters per minute), directed at the nonwoven web immediately after its formation. The air temperature is generally between about 200° and 550° F. (93° and 290° C.) for the thermoplastic polymers commonly used in spunbonding. The HAK's focused stream of air is arranged and directed by at least one slot of about ⅛ to 1 inches (3 to 25 mm) in width, particularly about ⅜ inch (9.4 mm), serving as the exit for the heated air towards the web, with the slot running in a substantially cross-machine direction over substantially the entire width of the web. In other embodiments, there may be a plurality of slots arranged next to each other or separated by a slight gap. The at least one slot is preferably, though not essentially, continuous, and may be comprised of, for example, closely spaced holes. The HAK has a plenum to distribute and contain the heated air prior to its exiting the slot. The plenum pressure of the HAK is preferably between about 1.0 and 12.0 inches of water (2 to 22 mmHg), and the HAK is positioned between about 0.25 and 10 inches and more preferably 0.75 to 3.0 inches (19 to 76 mm) above the forming wire. In a particular embodiment the HAK plenum's cross sectional area for cross-directional flow (i.e. the plenum cross sectional area in the machine direction) is at least twice the total slot exit area. Since the foraminous wire onto which spunbond polymer is formed generally moves at a high rate of speed, the time of exposure of any particular part of the web to the air discharged from the hot air knife is less a tenth of a second and generally about a hundredth of a second in contrast with the through air bonding process which has a much larger dwell time. The HAK process has a great range of variability and controllability of at least the air temperature, air velocity and distance from the HAK plenum to the web.

As used herein, through air bonding or "TAB" means a process of bonding a nonwoven conjugate fiber web in which air which is sufficiently hot to melt one of the polymers of which the fibers of the web are made is forced through the web. The air velocity is between 100 and 500 feet per minute and the dwell time may be as long as 6 seconds. The melting and resolidification of the polymer provides the bonding. Through air bonding is generally regarded a second step bonding process. Since TAB requires the melting of at least one component to accomplish bonding, it is restricted to webs with at least two components like conjugate fibers or those which include an adhesive.

As used herein, the term "stitchbonded" means, for example, the stitching of a material in accordance with U.S. Pat. No. 4,891,957 to Strack et al. or U.S. Pat. No. 4,631,933 to Carey, Jr.

As used herein, "ultrasonic bonding" means a process performed, for example, by passing the fabric between a sonic horn and anvil roll as illustrated in U.S. Pat. No. 4,374,888 to Bornslaeger.

As used herein "thermal point bonding" involves passing a fabric or web of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 19% bond area. Typically, the percent bonding area varies from around 10% to around 30% of the area of the fabric laminate web. As in well known in the art, the spot bonding holds the laminate layers together as well as imparts integrity to each individual layer by bonding filaments and/or fibers within each layer.

As used herein, the term "bonding window" means the range of temperature of the calender rolls used to bond the nonwoven fabric together, over which such bonding is successful. For polypropylene spunbond, this bonding window is typically from about 270° F. to about 310° F. (132° C. to 154° C.). Below about 270° F. the polypropylene is not hot enough to melt and bond and above about 310° F. the polypropylene will melt excessively and can stick to the calender rolls. Polyethylene has an even narrower bonding window.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

As used herein, the terms "necking" or "neck stretching" interchangeably refer to a method of elongating a nonwoven fabric, generally in the machine direction, to reduce its width in a controlled manner to a desired amount. The controlled stretching may take place under cool, room temperature or greater temperatures and is limited to an increase in overall dimension in the direction being stretched up to the elongation required to break the fabric, which in most cases is about 1.2 to 1.4 times. When relaxed, the web retracts toward its original dimensions. Such a process is disclosed, for example, in U.S. Pat. No. 4,443,513 to Meitner and Notheis, and U.S. Pat. No. 4,965,122, 4,981,747 and 5,114,781 to Morman.

As used herein, the terms "elastic" and "elastomeric" when referring to a fiber, film or fabric mean a material which upon application of a biasing force, is stretchable to a stretched, biased length which is at least about 150 percent, or one and a half times, its relaxed, unstretched length, and which will recover at least 50 percent of its elongation upon release of the stretching, biasing force.

As used herein the term "composite elastic material" refers to an elastic material which may be a multicomponent material or a multilayer material. For example, a multilayer material may have at least one elastic layer joined to at least one gatherable layer at least at two locations so that the gatherable layer is gathered between the locations where it is joined to the elastic layer. Such a multilayer composite elastic material may be stretched to the extent that the nonelastic material gathered between the bond locations allows the elastic material to elongate. One type of multilayer composite elastic material is disclosed, for example, by U.S. Pat. No. 4,720,415 to Vander Wielen et al., which is hereby incorporated by reference in its entirety, and in which multiple layers of the same polymer produced from multiple banks of extruders are used. Other composite elastic materials are disclosed in U.S. Pat. No. 4,789,699 to Kieffer et al., U.S. Pat. No. 4,781,966 to Taylor and U.S. Pat. Nos. 4,657,802 and 4,652,487 to Morman and 4,655,760 and 4,692,371 to Morman et al. A composite elastic material may also be one in which the gatherable web is a neckable material which is necked, and then is joined to an elastic sheet such as described in U.S. Pat. Nos. 5,226,992, 4,981, 747, 4,965,122 and 5,336,545 to Morman.

As used herein, the term "garment" means any type of non-medically oriented apparel which may be worn. This includes industrial work wear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

As used herein, the term "personal care product" means diapers, training pants, absorbent underpants, adult incontinence products, and feminine hygiene products.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

TEST METHODS

Melt Flow Rate: The melt flow rate (MFR) is a measure of the viscosity of a polymer. The MFR is expressed as the weight of material which flows from a capillary of known dimensions under a specified load or shear rate for a measured period of time and is measured in grams/10 minutes at a set temperature and load according to, for example, ASTM test 1238-90b.

Cyclic testing: Cyclic testing is performed using a Sintech 2 computerized material testing system available from Sintech Incorporated of Stoughton, Mass.

In the elongation or stretch to stop test, a 3 inch by 6 inch (76 mm by 152 mm) sample, with the larger dimension being the machine direction, is placed in the jaws of the Sintech 2 machine using a gap of 50 mm between the jaws. The sample is then pulled to a stop load of 2000 gms with a crosshead speed of about 500 mm per minute. The elongation in percent relative to the unstretched length at 2000 gms is the stretch to stop value.

The elongation at stop test also yields the value for elongation at intercept. The elongation at intercept is the percent stretch at the upper inflection point of the load versus percent stretch graph. The value of 75 percent of the elongation at intercept is used to determine the maximum percent the sample with then be stretched in the cycling test.

In the cyclic testing, a material is taken to a fixed extension corresponding to 75 percent of the elongation at intercept for 5 times, and allowed to return to its original dimensions if it will do so. The measurements taken are the load at elongation, hysteresis loss and load at return. This is used to develop a graphical representation of the results, with load on the y axis and elongation on the x axis, as for example in FIGS. 1, 2, and 3. This graph yields a curve with an area thereunder called the Total Energy Absorbed or "TEA". The ratio of the TEA curves for a sample for various cycles is a value independent of material, basis weight and sample width that can be compared to other samples.

DETAILED DESCRIPTION

Figure 1:
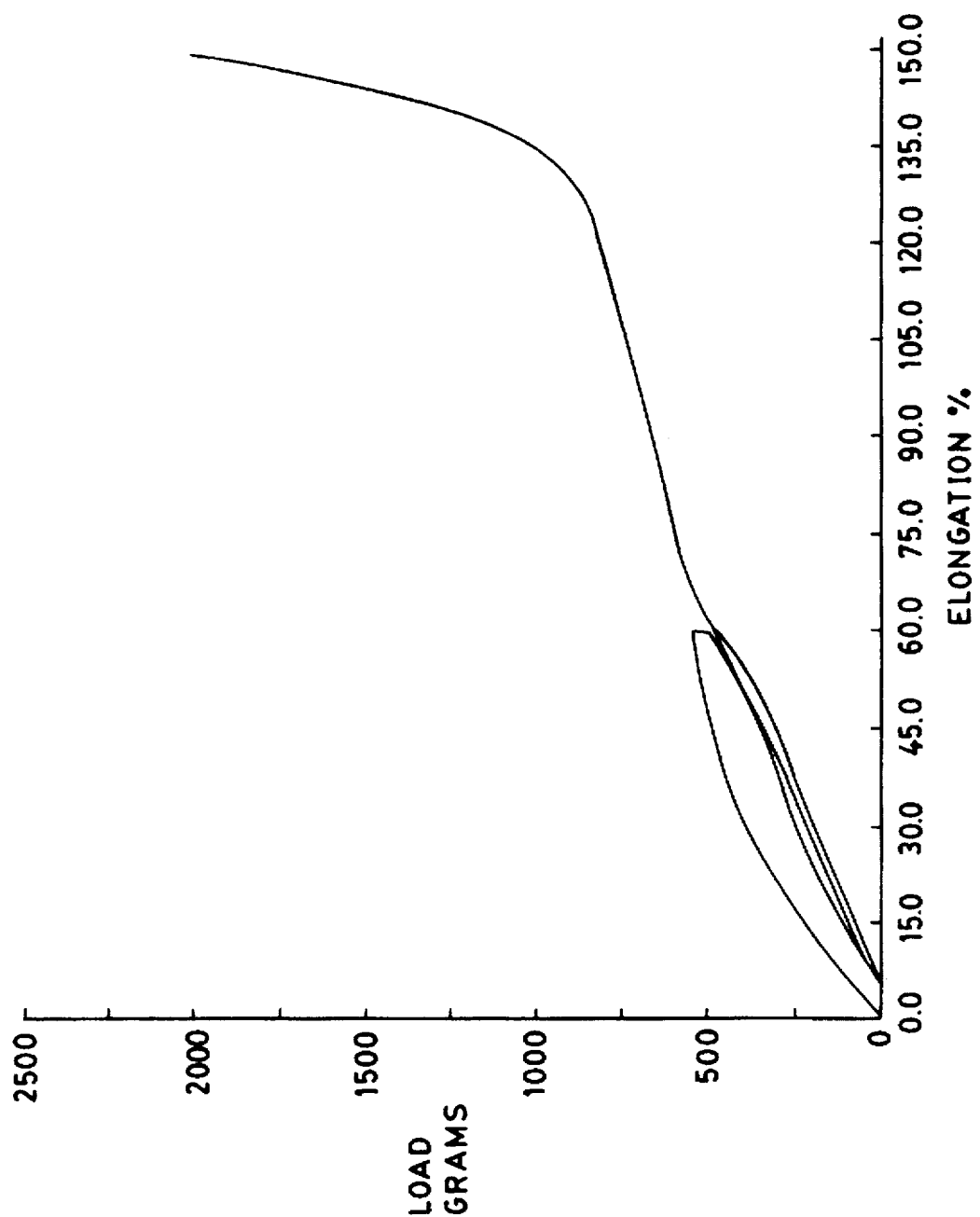
FIG. 1 shows a TEA curve of a composite elastic laminate of the Control.
Figure 2:
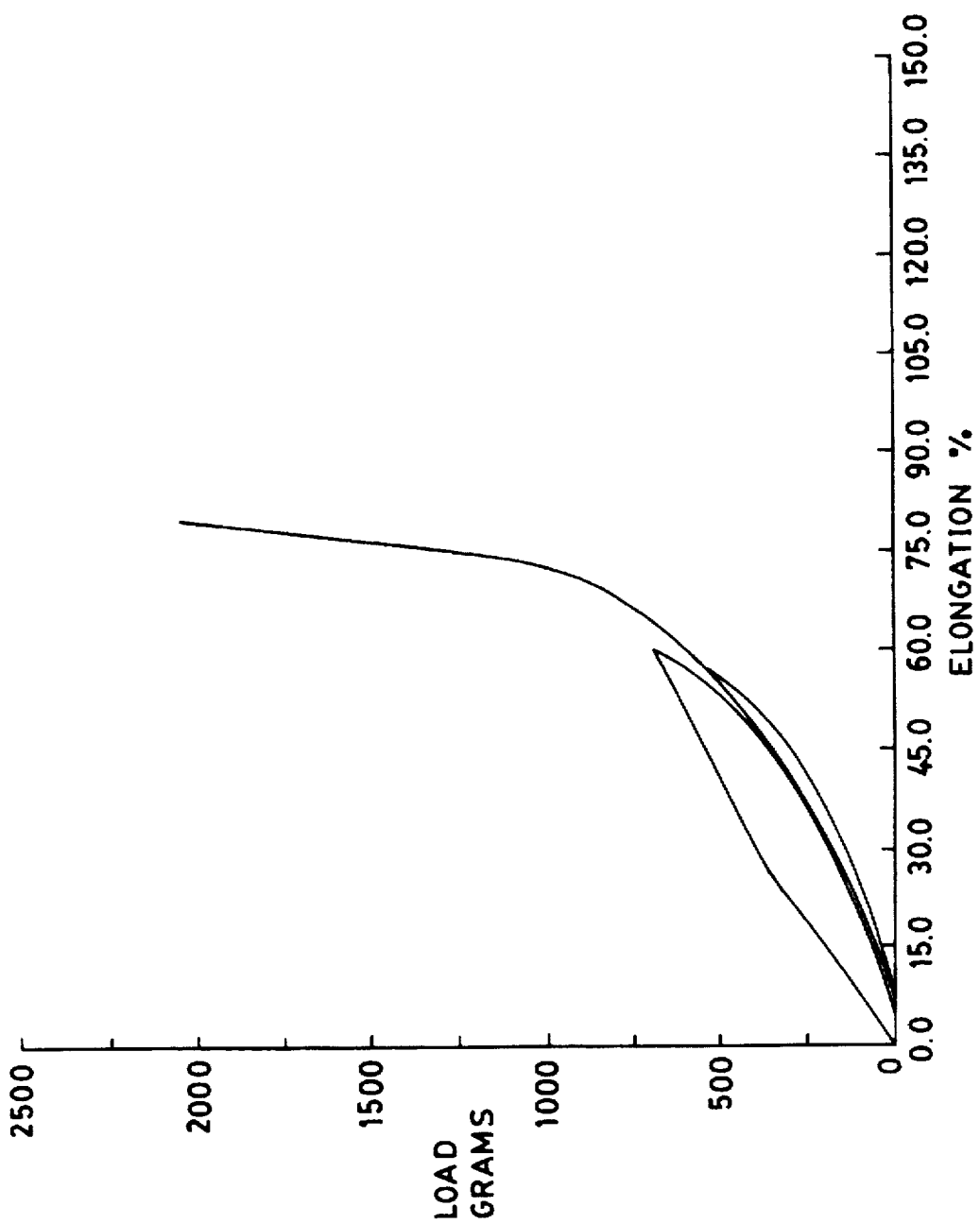
FIG. 2 shows a TEA curve of a composite elastic laminate of Example 1.
Figure 3:
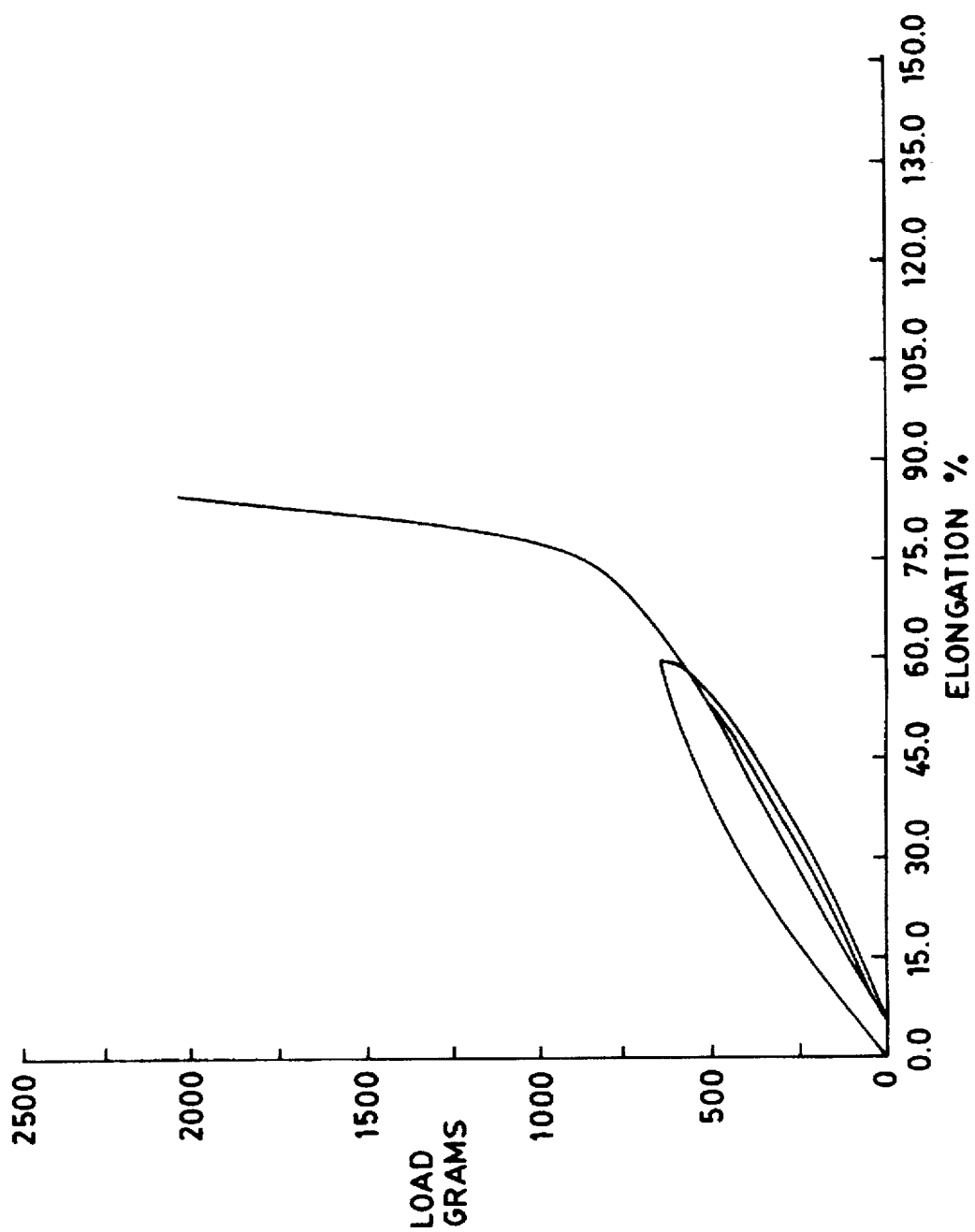
FIG. 3 shows a TEA curve of a composite elastic laminate of Example 2. The Y-axis indicates units of load in grams. The X-axis is the elongation in percent.

Thermoplastic polymers are useful in the production of films, fibers and webs for use in a variety of products such as personal care items, infection control products, garments and protective covers. In many applications it is desirable that the film, fiber or web be elastic so that the products made with the film, fiber or web can conform to an object or so that it may stretch somewhat without failing.

Elastomeric polymers have been used in the past for such applications but are somewhat difficult to process. U.S. Pat. No. 4,663,220 to Wisneski et al. discloses a method of improving the processibility of an elastomeric polymer through the addition of a polyolefin, particularly polyethylene, processing aid. Further, such products have a particular range of stretch and recovery characteristics.

The Applicant has produced a laminate having at least one layer made of a new class of polymers having different stretch and recovery characteristics than those previously used. This laminates has properties which are particularly useful and further, the structure is such that it allows the user to tailor the properties of the film, fiber or web laminate to her exact requirements.

The new class of polymers is referred to as "metallocene" polymers or as produced according to the metallocene process. The metallocene process generally uses a metallocene catalyst which is activated, i.e. ionized, by a co-catalyst.

Metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl (cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow.

The metallocene process, and particularly the catalysts and catalyst support systems are the subject of a number of patents. U.S. Pat. No. 4,542,199 to Kaminsky et al. describes a procedure wherein a co-catalyst like methylaluminoxane (MAO) is added to toluene, the metallocene catalyst of the general formula (cyclopentadienyl)2MeRHal wherein Me is a transition metal, Hal is a halogen and R is cyclopentadienyl or a C1 to C6 alkyl radical or a halogen, is added, and ethylene is then added to form polyethylene. U.S. Pat. No. 5,189,192 to LaPointe et al. and assigned to Dow Chemical describes a process for preparing addition polymerization catalysts via metal center oxidation. U.S. Pat. No. 5,352,749 to Exxon Chemical Patents, Inc. describes a method for polymerizing monomers in fluidized beds. U.S. Pat. No. 5,349,100 describes chiral metallocene compounds and preparation thereof by creation of a chiral center by enantioselective hydride transfer.

Co-catalysts are materials such as methylaluminoxane (MAO) which is the most common, other alkylaluminums and boron containing compounds like tris (pentafluorophenyl)boron, lithium tetrakis (pentafluorophenyl)boron, and dimethylanilinium tetrakis (pentafluorophenyl)boron. Research is continuing on other co-catalyst systems or the possibility of minimizing or even eliminating the alkylaluminums because of handling and product contamination issues. The important point is that the metallocene catalyst be activated or ionized to a cationic form for reaction with the monomer(s) to be polymerized.

Polymers produced using metallocene catalysts have the unique advantage of having a very narrow molecular weight range. FIG. 1 shows a typical molecular weight distribution for a Ziegler-Natta catalyst versus a metallocene type catalyst with the metallocene catalyst yielding the narrower curve. Polydispersity numbers (Mw/Mn) of below 4 and even below 2 are possible for metallocene produced polymers. These polymers also have a narrow short chain branching distribution when compared to otherwise similar Ziegler-Natta produced type polymers.

It is also possible using a metallocene catalyst system to control the isotacticity of the polymer quite closely when stereo selective metallocene catalysts are employed. In fact, polymers have been produced having an isotacticity of in excess of 99 percent. It is also possible to produce highly syndiotactic polypropylene using this system.

Controlling the isotacticity of a polymer can also result in the production of a polymer which contains blocks of isotactic and blocks of atactic material alternating over the length of the polymer chain. This construction results in an elastic polymer by virtue of the atactic portion. Such polymer synthesis is discussed in the journal *Science*, vol. 267, (13 Jan., 1995) at p. 191 in an article by K. B. Wagner. Wagner, in discussing the work of Coates and Waymouth, explains that the catalyst oscillates between the stereochemical forms resulting in a polymer chain having running lengths of isotactic sterocenters connected to running lengths of atactic centers. Isotactic dominance is reduced producing elasticity. Geoffrey W. Coates and Robert M. Waymouth, in an article entitled "Oscillating Stereocontrol: A Strategy for the Synthesis of Thermoplastic Elastomeric Polypropylene" at page 217 in the same issue, discuss their work in which they used metallocene bis(2-phenylindenyl)-zirconium dichloride in the presence of methylaluminoxane (MAO), and, by varying the pressure and temperature in the reactor, oscillate the polymer form between isotactic and atactic.

Commercial production of metallocene polymers is somewhat limited but growing. Such polymers are available from Exxon Chemical Company of Baytown, Tex. under the trade names EXXPOL® and ACHIEVE™ for polypropylene based polymers and EXACT® and EXCEED™ for polyethylene based polymers. Dow Chemical Company of Midland, Mich. has polymers commercially available under the name ENGAGE®. These materials are believed to be produced using non-stereo selective metallocene catalysts. Exxon generally refers to their metallocene catalyst technology as "single site" catalysts while Dow refers to theirs as "constrained geometry" catalysts under the name INSITE® to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade. In the practice of the instant invention, elastic polyolefins like polypropylene and polyethylene are suitable.

Regarding metallocene based elastomeric polymers, U.S. Pat. No. 5,204,429 to Kaminsky et al. describes a process which may produce elastic copolymers from cycloolefins and linear olefins using a catalyst which is a sterorigid chiral metallocene transition metal compound and an aluminoxane. The polymerization is carried out in an inert solvent such as an aliphatic or cycloaliphatic hydrocarbon such as toluene. The reaction may also occur in the gas phase using the monomers to be polymerized as the solvent. U.S. Pat. Nos. 5,278,272 and 5,272,236, both to Lai et al., assigned to Dow Chemical and entitled "Elastic Substantially Linear Olefin Polymers" describe polymers having particular elastic properties. Dow also commercially produces a line of elastomeric polyolefins under the trade name ENGAGE®.

Other elastomeric thermoplastic polymers useful in the practice of this invention may be those made from block copolymers such as polyurethanes, copolyetheresters, polyamide polyether block copolymers, ethylene vinyl acetates (EVA), block copolymers having the general formula A-B-A', A-B-A-B, or A-B like copoly(styrene/ethylene-butylene), (polystyrene/poly(ethylene-butylene)/polystyrene), poly(styrene/ethylene-butylene/styrene) and the like.

Useful elastomeric resins include block copolymers having the general formula A-B-A', or A-B, where A and A' are each a thermoplastic polymer endblock which contains a styrenic moiety such as a poly (vinyl arene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated $(A-B)_m$-X, wherein X is a polyfunctional atom or molecule and in which each $(A-B)_m$- radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer", and particularly "A-B-A'" and "A-B" block copolymer, is intended to embrace all block copolymers having such rubbery blocks and thermoplastic blocks as discussed above, which can be extruded (e.g., by meltblowing), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON® materials which are available from Shell Chemical Company of Houston, Tex. KRATON® block copolymers are available in several different formulations, a number of which are identified in U.S. Pat. No. 4,663,220, hereby incorporated by reference.

Polymers composed of an elastomeric A-B-A'-B' tetrablock copolymer may also be used in the practice of this invention. Such polymers are discussed in U.S. Pat. No. 5,332,613 to Taylor et al. In such polymers, A is a thermoplastic polymer block and B is an isoprene monomer unit hydrogenated to substantially a poly(ethylene-propylene) monomer unit. An example of such a tetrablock copolymer is a styrene-poly(ethylene-propylene)-styrene-poly (ethylene-propylene) or SEPSEP elastomeric block copolymer available from the Shell Chemical Company of Houston, Tex. under the trade designation KRATON® G-1657.

The thermoplastic copolyester elastomers include copolyetheresters having the general formula:

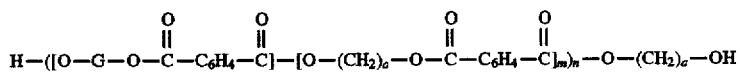

where "G" is selected from the group consisting of poly(oxyethylene)-alpha,omega-diol, poly(oxypropylene)-alpha,omega-diol, poly(oxytetramethylene)-alpha,omega-diol and "a", "m" and "n" are positive integers. Such materials generally have an elongation at break of from about 600 percent to 750 percent when measured in accordance with ASTM D-638 and a melt point of from about 350° F. to about 400° F. (176° to 205° C.) when measured in accordance with ASTM D-2117.

Commercial examples of such copolyester materials are, for example, those known as ARNITEL®, formerly available from Akzo Plastics of Arnhem, Holland and now available from DSM of Sittard, Holland, or those known as HYTREL® which are available from E.I. DuPont de Nemours of Wilmington, Del. Formation of an elastomeric nonwoven web from polyester elastomeric materials is disclosed in, for example, U.S. Pat. No. 4,741,949 to Morman et al., hereby incorporated by reference.

Other exemplary elastomeric materials which may be used include polyurethane elastomeric materials such as, for example, those available under the trademark ESTANE® from B.F. Goodrich & Co. or MORTHANE® from Morton Thiokol Corp., polyamide polyether block copolymer such as, for example, that known as PEBAX®, available from Atochem Inc. Polymers Division (RILSAN®), of Glen Rock, N.J. and polyester elastomeric materials such as, for example, those available under the trade designation HYTREL® from E.I. DuPont De Nemours & Company.

Elastomeric polymers also include copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117.

It is also possible to have other materials blended with the elastomer used to produce a layer according to this invention like fluorocarbon chemicals to enhance chemical repellence which may be, for example, any of those taught in U.S. Pat. No. 5,178,931, fire retardants for increased resistance to fire and/or pigments to give each layer the same or distinct colors. Fire retardants and pigments for spunbond and meltblown thermoplastic polymers are known in the art and are internal additives. A pigment, if used, is generally present in an amount less than 5 weight percent of the layer while other materials may be present in a cumulative amount less than 25 weight percent.

Items made from the laminates of this invention may also have topical treatments applied to it for more specialized functions. Such topical treatments and their methods of application are known in the art and include, for example, alcohol repellence treatments, anti-static treatments and the like, applied by spraying, dipping, etc. An example of such a topical treatment is the application of Zelec® antistat (available from E.I. DuPont, Wilmington, Del.).

When the laminates of this invention are in the form of nonwoven fabric, they may be produced by the meltblowing or spunbonding processes which are well known in the art. These processes generally use an extruder to supply melted thermoplastic polymer to a spinneret where the polymer is fiberized to yield fibers which may be staple length or longer. The fibers are then drawn, usually pneumatically, and deposited on a moving foraminous mat or belt to form the nonwoven fabric. The fibers produced in the spunbond and meltblown processes are microfibers as defined above.

Spunbond nonwoven fabrics are generally pre- or primarily bonded in some manner as they are produced in order to give them sufficient structural integrity to withstand the rigors of further processing into a finished product. This primary bonding may be done by compaction rollers or by hot-air knife. Secondary bonding can be accomplished in a number of ways such as hydroentanglement, needling, ultrasonic bonding, adhesive bonding, stitchbonding, through-air bonding and thermal bonding.

Multiple layers of meltblown fabrics may be bonded by needlepunching, ultrasonic bonding, adhesive attachment, thermal bondiing and extrusion coating.

An example of a multilayer laminate is an embodiment wherein some of the layers are spunbond and some meltblown such as a spunbond/meltblown/spunbond (SMS) laminate as disclosed in U.S. Pat. No. 4,041,203 to Brock et al., U.S. Pat. No. 5,169,706 to Collier, et al, and U.S. Pat. No. 4,374,888 to Bornslaeger which are hereby incorporated by reference in their entirety. Such a laminate may be made by sequentially depositing onto a moving forming belt first a spunbond fabric layer, then a meltblown fabric layer and last another spunbond layer and then bonding the laminate in a manner described above. Alternatively, the fabric layers may be made individually, collected in rolls, and combined in a separate bonding step such as that disclosed in U.S. Pat. No. 4,720,415, hereby incorporated by reference in its entirety. Such multilayer laminates usually have a basis weight of from about 0.1 to 12 osy (6 to 400 gsm), or more particularly from about 0.75 to about 3 osy.

The composite elastic material of this invention has at least one layer of an elastic polyolefin with at least one layer of another type of elastic polymer and a gatherable web which is joined to the elastic webs. This may be done while the elastic webs are stretched and or while the gatherable web is necked. The elastic polyolefin is preferably made by the metallocene process. There may be two gatherable webs; one on each side of the elastic layers, and there may be multiple elastic layers. The elastic layers may be arranged, for example, with the elastic polyolefin material in the center, an elastic layer of another type of polymer on either side of the elastic polyolefin material, and finally a gatherable layer bonded to each of the other elastic layers. The laminate may have the elastic polyolefin layer in the center, other elastic layers on either side and then additional layers of elastic polyolefin on either side of the other elastic layers and finally the gatherable layers as outer layers. The number and arrangement of the layers is limited only by equipment and imagination.

The gatherable web of this invention may be a spunbond web of, for example, a polyolefin like polypropylene, or may be any other suitable material which lacks the characteristics of an elastic as defined above.

Figure 4:
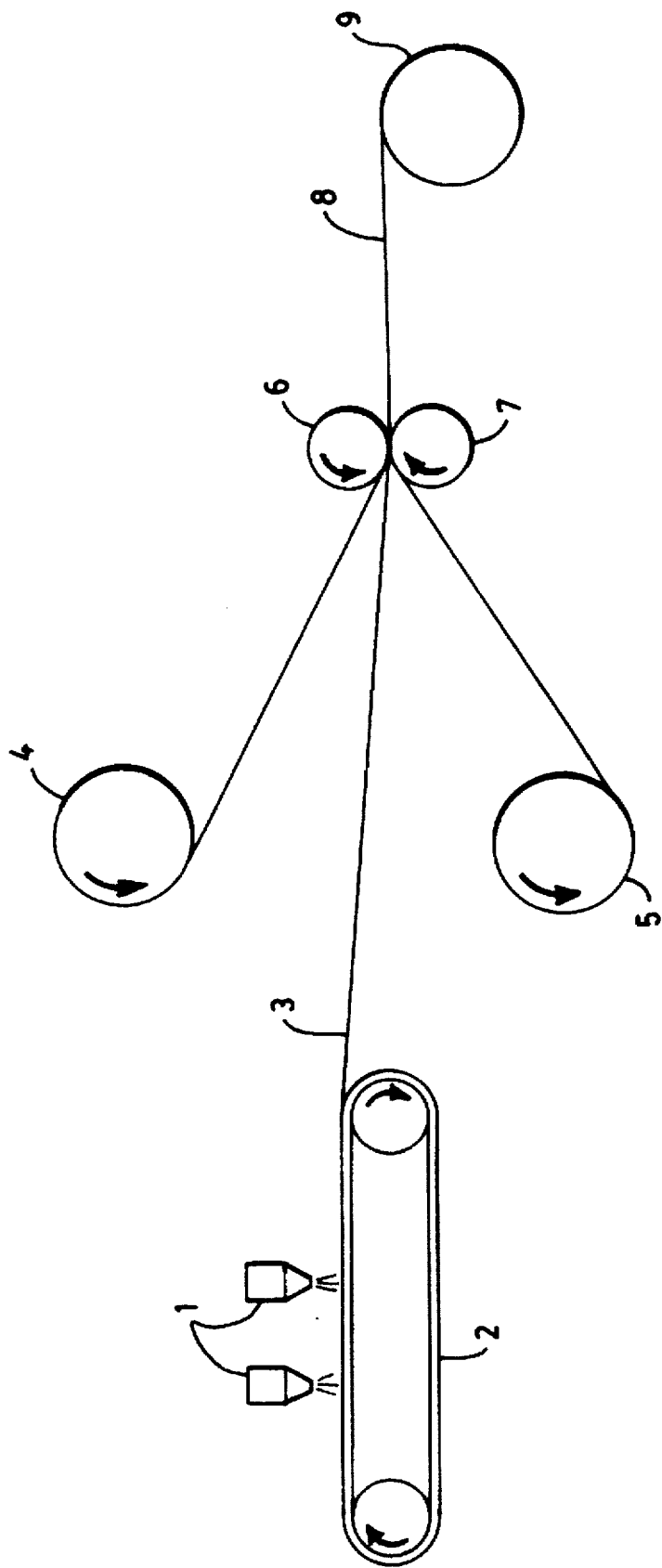
FIG. 4 shows a schematic diagram of an in-line manufacturing process suitable for the production of a composite elastic material.

FIG. 4 shows a schematic diagram of a continuous manufacturing in-line process for stretch bonding elastic and gatherable webs into a laminate wherein there are two gatherable webs on each opposite side of a stretchable web of two elastomeric polymers. In the Figure, an elastic polymer is deposited onto a forming wire 2 from each of two meltblowing spinnerets 1 producing an elastic web 3. The forming wire 2 moves at a certain first speed as the layers are deposited. The elastic web 3 moves forward to pass through bonder rolls 6, 7 where the elastic web 3 is combined with, in this case, two, gatherable webs 4, 5 unwould from supply rolls. The bonder rolls 6, 7 are shown as being comprised of a patterned calender roll 6 and a smooth anvil roll 7 but other methods and arrangements as noted herein may be used. The webs 3, 4, 5 travel in the direction indicated by the arrows associated with the rolls for forming wire 2 and the supply rolls, respectively. The elastic web 3 is stretched to the desired amount by having the bonder rolls 6, 7 rotate at a speed greater than that at which the forming wire 2 moves, producing a bonder/wire ratio of speed. The pressure between the rollers 6, 7 bonds the gatherable webs 4, 5 to the elastic web 3 to form a composite elastic material 8. The composite elastic material 8 is then wound up on a winder 9.

The inventors have found that a laminate wherein at least one layer is made of an elastomeric polyolefin preferably having a polydispersity of less than 4, with at least one other elastomeric polymer layer and a non-elastic gatherable web, allows the precise control of the elastomeric properties, e.g. hysteresis, of a product produced from such a laminate. In particular a laminate having one layer of an elastomeric polyolefin with one layer of elastomeric poly(styrene/ethylene-butylene/styrene) block copolymer and a polypropylene gatherable web on either side produces a particularly good blend of stretch and recovery characteristics.

outer layers as the gatherable webs and a meltblown inner layer of Shell's Kraton® G-2755 polymer and a second meltblown inner layer of Dow's ENGAGE® 58200.02 polymer. The layers were thermally bonded to produce the laminate with a 13 percent bond area pattern while the elastic meltblown layer was stretched using the bonder/wire ratio as shown in the Table.

The Control and Examples were tested for stretch properties according to the cyclic testing method described above under "Test Methods" and the results are given in Table 1. In the Table, the abbreviation EXT means "extension", RET means "return", STS means "stretch to stop", MB means "meltblown" and BW means "basis weight".

TABLE 1

| | Basis Weight in Laminate GSM | Stretch to Stop % | Cycle 1 EXT TEA | Cycle 1 RET TEA | Cycle 5 EXT TEA | Cycle 5/1 EXT/TEA Ratio | Load at Intercept g | Cycling Elongation % | Load at 30% Elong. g | Load at 40% Elong. g | Load at cycling Elongation g | Melt Temp. F. | Air Temp. F. | Bonder to wire ratio | Bonding Temp. F. (set) |
|---|---|---|---|---|---|---|---|---|---|---|---|---|---|---|---|
| Example 2 | 64 | 86.9 | 30.5 | 20.4 | 21.7 | 0.7115 | 854 | 60 | 420 | 515 | 680 | 455 | 491 | 2.9 | 135 |
| Example 2 | 56 | 111.3 | 44.5 | 28.1 | 30.8 | 0.6921 | 927 | 80 | 368 | 461 | 735 | 455 | 491 | 3.8 | 135 |
| Example 2 | 65 | 83.3 | 30.9 | 20.2 | 20.3 | 0.6570 | 871 | 60 | 415 | 527 | 730 | 466 | 477 | 4.2 | 145 |
| Example 1 | 70 | 74.2 | 27.2 | 16.4 | 16.7 | 0.6139 | 813 | 60 | 356 | 462 | 681 | 431 | 438 | 2.8 | 170 |
| Example 1 | 65 | 90 | 28.9 | 17.6 | 17.9 | 0.6194 | 774 | 60 | 378 | 497 | 725 | 401 | 438 | 4.2 | 170 |
| Control | 47 | 151.4 | 30.7 | 20 | 21.2 | 0.6906 | 957 | 60 | 436 | 513 | 618 | −500 | 474 | 3.2 | 130 |
| Control | 47 | 151.4 | 49.9 | 29.3 | 31.8 | 0.6373 | 957 | 80 | 460 | 535 | 716 | −500 | 474 | 4.5 | 130 |

In order to illustrate the advantages of laminates according to this invention, the following Examples and Controls were developed. Note that the process conditions used to produce these laminates are given in Table 1.

CONTROL

Two samples of a composite elastic material were produced using 0.4 osy (13.6 gsm) polypropylene spunbond outer layers as the gatherable webs and an elastic meltblown inner layer of Shell's Kraton® G-2755 poly(styrene/ethylene-butylene/styrene) or SEBS resin. The layers were thermally bonded to produce the laminate with a 13 percent bond area pattern while the elastic meltblown layer was stretched using the bonder/wire ratio as shown in the Table.

EXAMPLE 1

Three samples of a composite elastic material were produced using 0.4 osy (13.6 gsm) polypropylene spunbond outer layers as the gatherable webs and a meltblown inner layer of Dow's ENGAGE® 58200.02 metallocene polymer having a melt flow index of 30 grams/10 minutes at 190° C. and and 2160 gm load. The layers were thermally bonded to produce the laminate with a 13 percent bond area pattern while the elastic meltblown layer was stretched using the bonder/wire ratio as shown in the Table.

EXAMPLE 2

Two samples of a composite elastic material were produced using 0.4 osy (13.6 gsm) polypropylene spunbond The Table shows that by providing layers of elastomeric polyolefin and non-polyolefin elastomer in a laminate, good control of the stretch and recovery properties is possible and it is possible to produce a laminate with more or less stretch and better or worse recovery than other laminates. This control allows the users of products made from the laminates of this invention to more exactly tailor their products to the needs of their customers, thus also producing for cost savings since the product will provide the required stretch, but not more or less than required. For example, producing a laminate having an elastic polyolefin layer with a layer of elastomeric polyurethane on each side will produce a laminate with different stretch and recovery characteristics than a laminate with an elastic polyolefin layer with a layer of elastomeric SEBS on each side. Placing an elastic polyolefin layer on either side of an elastic polyetherester will provide a laminate with different hysteresis from the previous two.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A controlled hysteresis composite elastic material comprising a first layer which is an elastomeric polyolefin layer and which is joined to at least one other layer comprised of an elastomeric polymer selected from the group consisting of polyurethanes, copolyether esters, polyamide polyether block copolymers, ethylene vinyl acetates (EVA), and block copolymers having the general formula A-B-A', A-B-A-B or A-B, and which is also joined to a third layer which is a gatherable web.

2. The material of claim 1 wherein said polyolefin has a polydispersity of less than 4.

3. The material of claim 1 wherein said third layer is neckstretched while joined.

4. The material of claim 1 wherein said elastomeric layers are stretched while joined to said gatherable web.

5. The material of claim 1 wherein said layers are joined together by a method selected from the group consisting of needlepunching, adhesive attachment, thermal bonding and extrusion coating.

6. The material of claim 1 wherein said elastomeric layers are films.

7. The material of claim 1 wherein said at least one other elastomeric layer is a web comprised of fibers comprised of polymers selected from the group consisting of polyurethanes, copolyether esters, polyamide polyether block copolymers, ethylene vinyl acetates (EVA), copoly (styrene/ethylene-butylene), (polystyrene/poly(ethylene-butylene)/polystyrene), and poly(styrene/ethylene-butylene/styrene).

8. The material of claim 1 wherein said first layer is a meltblown web of microfibers comprising an elastomeric polyolefin having a polydispersity of less than 4 and said at least one other layer is a meltblown web comprising poly(styrene/ethylene-butylene/styrene).

9. A personal care product selected from the group consisting of diapers, training pants, absorbent underpants, adult incontinence products, and feminine hygiene products comprised of the meltblown web material of claim 8.

10. The personal care product of claim 9 which is a diaper.

11. The personal care product of claim 9 which is an absorbent underpant.

12. The personal care product of claim 9 which is an adult incontinence product.

13. The personal care product of claim 9 which is a feminine hygiene product.

14. A controlled hysteresis composite elastic material comprising a first layer which is a metallocene polyolefin layer comprised of fibers having an average diameter less than about 10 microns and which is joined to a second layer comprised of fibers having an average diameter less than about 10 microns comprised of an elastomeric polymer selected from the group consisting of polyurethanes, copolyether esters, polyamide polyether block copolymers, ethylene vinyl acetates (EVA), and block copolymers having the general formula A-B-A', A-B-A-B or A-B, which are also joined to a third layer which is a gatherable web of fibers having an average diameter greater than about 7 microns.

15. The material of claim 14 in which said first and second layers are stretched while joined to said third layer.

16. The material of claim 14 which further comprises a another gatherable web of fibers having an average diameter of greater than about 7 microns which is joined to said first layer.

17. The material of claim 14 which further comprises a fourth layer comprised of fibers having an average diameter less than about 10 microns comprised of an elastomeric polymer selected from the group consisting of polyurethanes, copolyether esters, polyamide polyether block copolymers, ethylene vinyl acetates (EVA), and block copolymers having the general formula A-B-A', A-B-A-B or A-B, joined to said first layer and a fifth layer which is a gatherable web of fibers having an average diameter greater than about 7 microns joined to said fourth layer, wherein said first second and fourth layers are stretched while joined.

* * * * *

UNITED STATES PATENT AND TRADEMARK OFFICE
CERTIFICATION OF CORRECTION

PATENT NO. : 5,709,921

DATED : January 20, 1998

INVENTOR(S): Shawver

It is certified that errors appear in the above-identified patent and that said Letters Patent is hereby corrected as shown below:

Column 1, line 9, "visa vis" should read --vis a vis--;
Column 4, line 39, "The at least one" should read --Then at least one--;
Column 5, line 49, "As in well known" should read --As is well known--;
Column 5, line 58, "and bond and above" should read --and bond, and above--;
Column 7, line 31, "sample with then be" should read --sample will then be--;
Column 9, line 8, "isotacticity of in excess" should read --isotacticity in excess--;
Column 12, line 32, "stretched and or while" should read --stretched and/or while--;
Column 12, line 61, "unwould" should read --unwound--;
Column 13, line 60, "and and 2160 gm load" should read --and 2160 gm load--.

Signed and Sealed this

Twenty-fifth Day of August, 1998

Attest:

BRUCE LEHMAN

*Attesting Officer*  *Commissioner of Patents and Trademarks*